United States Patent [19]

Neumann et al.

[11] 4,295,851
[45] Oct. 20, 1981

[54] PROCESS FOR THE PRODUCTION OF NEGLIGIBLY DUSTY PREPARATION

[75] Inventors: Konrad Neumann, Wyhlen; Ernst Schenkenberger, Rheinfelden; Friedrich Resch, Lörrach, all of Fed. Rep. of Germany

[73] Assignee: Ciba-Geigy Corporation, Ardsley, N.Y.

[21] Appl. No.: 160,256

[22] Filed: Jun. 17, 1980

Related U.S. Application Data

[63] Continuation of Ser. No. 858,031, Dec. 6, 1977, abandoned.

[30] Foreign Application Priority Data

Dec. 13, 1976 [DE] Fed. Rep. of Germany ....... 2656408

[51] Int. Cl.³ .................. C09B 67/06; C09B 67/08; C09B 67/24; C09B 67/32
[52] U.S. Cl. .......................... 8/524; 8/527; 8/561; 8/648
[58] Field of Search ............................ 8/524

[56] References Cited

U.S. PATENT DOCUMENTS

| | | | |
|---|---|---|---|
| 2,819,258 | 1/1958 | Schmid et al. | 8/79 |
| 3,086,833 | 4/1963 | Streck | 8/79 |
| 3,560,134 | 2/1971 | Streck | 8/79 |
| 3,894,836 | 7/1975 | Frei | 8/79 |
| 3,967,921 | 7/1976 | Haberli et al. | 8/93 |
| 3,967,922 | 7/1976 | Wolf et al. | 8/93 |
| 3,971,852 | 7/1976 | Brenner et al. | 8/79 |
| 4,042,320 | 8/1977 | Becker et al. | 8/79 |
| 4,069,013 | 1/1978 | Hett et al. | 8/79 |
| 4,134,725 | 1/1979 | Buchel et al. | 8/79 |

FOREIGN PATENT DOCUMENTS

| | | | |
|---|---|---|---|
| 2459895 | 7/1975 | Fed. Rep. of Germany . | |
| 7006385 | 11/1970 | Netherlands | 8/79 |
| 576100 | 3/1946 | United Kingdom | 8/79 |
| 713541 | 8/1954 | United Kingdom | 8/93 |
| 1373167 | 11/1974 | United Kingdom | 8/79 |
| 1477379 | 6/1977 | United Kingdom . | |

OTHER PUBLICATIONS

Derwent Belgian Patents Report No. 37/65, 661016 Oct. 1965.
Patterson, A. Textile Colorist Jul. 1951, pp. 462–463.
Chemical & Engineering News vol. 34 #5, 1/30/56 pp. 477–480.
Haekh's Chemical Dictionary, McGraw-Hill Book Co. N.Y. 1969 p. 31.

*Primary Examiner*—Joseph L. Schofer
*Assistant Examiner*—Maria Parrish Tungol
*Attorney, Agent, or Firm*—Edward McC. Roberts

[57] ABSTRACT

Described is a process for the production of negligibly dusty preparations by spray drying an aqueous suspension containing at least one water-soluble dye or optical brightener and optionally further additives, characterized in that a dust-binding surface active agent is added to the aqueous suspension containing at least one adhesive as e.g. sorbitol and/or to the spray-dried product.

14 Claims, No Drawings

PROCESS FOR THE PRODUCTION OF NEGLIGIBLY DUSTY PREPARATION

This is a Continuation of application Ser. No. 858,031 filed on Dec. 16, 1977, now abandoned.

The invention relates to a process for the production of negligibly dusty preparations, and to the negligibly dusty preparations obtained by this process, and to the use thereof for the dyeing or optical brightening of textile materials.

It is known that aqueous suspensions of dyes can be spray-dried. The dye powders thus obtained tend however to cause severe dust contamination, which renders the handling of these dye powders very difficult and hence limits their possibilities of application. It is also known that to overcome this disadvantage the undesirable dust can be bound by the subsequent addition of a dust-binding agent to the spray-dried dye. But even with the addition of large amounts of dust-binding agent, no lasting binding of the dust can be obtained in the majority of cases. In the course of a few weeks, a non-dusty dye becomes once again a dusty dye.

It has now been found that a dust-binding effect which surprisingly remains unchanged over a period of several months is obtained by spray drying an aqueous suspension containing at least one water-soluble dye or optical brightener and optionally further additives, and adding a dust-binding agent to the aqueous suspension containing at least one adhesive and/or to the spray-dried product.

The water-soluble dyes usable in the process according to the invention are, e.g., anionic dyes, cationic dyes, reactive dyes and metal-complex dyes such as 1:1- and 1:2-copper complexes, 1:1- or 1:2-chromium complexes or 1:1- and 1:2-cobalt complexes. Suitable chemical classes of dyes are, for example, nitro, monoazo, disazo, polyazo, stilbene, diphenylmethane, triphenylmethane, quinophthalone, coumarin, acridine, anthraquinone, styryl, oxazine, azomethine or methine dyes. Particularly good results are obtained with cationic dyes.

Optical brighteners of any class can be used. They can be, for example, stilbene compounds such as cyanuric derivatives of 4,4'-diaminostilbene-2,2'-disulphonic acid or distyrylbiphenyls, coumarins, benzocoumarins, pyrazines, pyrazolines, oxazines, mono- or dibenzoxazolyl compounds or mono- or dibenzimidazolyl compounds, and also naphthalic acid imides and naphthotriazole derivatives and v-triazole derivatives.

The dyes or optical brighteners can be used both in the dry form and in the form of aqueous press cake. It is also possible under certain circumstances to use directly the reaction mixture of the dye synthesis or of the optical brightener synthesis.

The adhesives usable in the process according to the invention are compounds which soften or melt in the temperature range of 30°–150° C., and should preferably be soluble in water. The following are for example suitable: urea, hydrated dextrose, glucose, lactose, mannitol, mannose, neopentyl glycol, and polyethylene glycol having a molecular weight of above 3000. The compounds preferred are those containing at least five hydroxyl groups per molecule, e.g. sugar derivatives such as dextrin or sorbitol, or polymeric alcohols, such as polyvinyl alcohol. These adhesives are added in an amount of at least 5 percent by weight, preferably 10 to 50 percent by weight, and particularly 30 percent by weight, relative to the dry final product, to the aqueous suspension. Sorbitol is preferably used in an amount of 5–10% by weight. The maximum amount of adhesive is determined, inter alia, by the desired degree of dilution of the dye. The adhesives can be added in solid form to the dye/water mixture or to the optical brightener/water mixture. On account of the better effect however, the adhesive is preferably used in the form of an aqueous solution.

Further additives which are optionally added are diluting agents, e.g. inorganic salts, which at the spray-drying temperature do not undergo any undesired reactions with the dye or optical brightener, and which do not appreciably change their original grain structure. These salts are above all alkali metal salts of strong inorganic acids, such as sulphuric acid, phosphoric acid, hydrochloric acid and carbonic acid. The following are for example used: mono-, di- and trisodium phosphate, sodium pyrophosphate, sodium chloride, potassium chloride, sodium hydrogen carbonate or sodium carbonate and preferably sodium hydrogen sulphate, and especially anhydrous sodium sulphate.

Further additives which can be added to the aqueous suspension are dispersing agents and stabilisers against oxidative or reductive effects, also acids or bases or buffering substances in order to adjust to a specific pH value.

Depending on the dye or optical brightener, suitable dust-binding agents are surface-active agents of anionic, cationic and, in particular, nonionic character. These should preferably be soluble in water.

Suitable nonionic surface-active agents are, in particular: fatty acid ethanolamides such as oleic acid diethanolamide or coconut fatty acid ethanolamide; fatty acid amides such as coconut fatty acid amide, polyethylene glycols having a molecular weight preferably of 200 to 4000, and condensation products from fatty acids (e.g. oleic acid or ricinoleic acid), or aliphatic alcohols (e.g. octanol or decyl alcohol), or optionally substituted phenols (e.g. alkylphenol, such as nonylphenol) with ethylene oxide. Furthermore, it is possible to use copolymers from ethylene oxide and propylene oxide (so-called block polymers).

The dust-binding agent is used in a maximum amount of 1 to 15 percent by weight, preferably 5 to 10 percent by weight, relative to the dry final product.

The process according to the invention consists of subjecting an aqueous suspension, which contains at least one water-soluble dye or optical brightener and optionally further additives, to a spray-drying operation; it is in this connection essential that the final product contains a combination of the defined adhesive and dust-binding agent. This is effected either by adding the dust-binding agent before spray drying to the aqueous suspension containing at least one adhesive, or by adding the dust-binding agent after spray drying to the spray-dried product. It is also possible however to combine both measures by adding a part of the dust-binding agent to the aqueous suspension, and the remaining part to the spray-dried product.

In the case of dyes or optical brighteners sensitive to temperature it is moreover advantageous to use a spray dryer which is provided with a cooled atomising organ, as described, e.g., in German Offenlegungsschrift No. 2,459,895.

The dust-binding agent is added preferably in liquid form to the spray-dried product. The dust-binding agent is applied to the spray-dried product preferably by fine or coarse spraying, with this operation being performed, e.g., in a heatable mixer which can contain an incorporated mixing tool (intensive mixer, high speed mixer or kneader mixer).

The dust-binding agent can be added to the spray-dried product either immediately after spray drying or after cooling of the spray-dried product, with the dust-binding agent having a temperature which is between room temperature and at most the boiling point of the dust-binding agent. Preferably, the dust-binding agent is heated to about 60° to 100° C., and then applied to the spray dried product heated to about 60° to 85° C.

In a preferred embodiment, an aqueous suspension containing a cationic dye, dextrin and small amounts of a dust-binding agent is thoroughly stirred, spray-dried and subsequently sprayed at a product temperature of about 70° C. with a further amount of the dust-binding agent at about 100° C., with a condensation product from nonylphenol and ethylene oxide being used as the dust-binding agent.

By the process according to the invention there are obtained preparations which are negligibly dusty to non-dusty, and which retain this property even when stored for several months, e.g. 6 to 12 months, at a temperature of $-10°$ C. to $+50°$ C.

The following dust test is carried out to determine the behaviour of the substance with regard to the release of dust.

Onto a metal cylinder having a capacity of 500 ccm is placed a metal funnel having an inside diameter of 10 cm and a tube (inside diameter 15 mm) of which the lower end extends down to the 200 ccm level on the cylinder. At the 400 ccm level on the cylinder is fixed a round paper filter having a hole at the centre (Schleicher & Schuell LS 14); the filter paper is moistened with water to the extent that it is moderately moist but not dripping wet. An amount of 10 g of the substance to be tested is then quickly poured through the funnel; after a waiting time of 3 minutes, the funnel is taken out and the round filter paper is removed by cutting. This filter paper is evaluated on the basis of a 5-rating scale as follows:

rating 1 = highly dusty if the round paper filter is heavily tinted to intensely dyed;

rating 2 = considerably dusty if the round paper filter is slightly tinted;

rating 3 = moderately dusty if the round paper filter displays a large number of spots of colour which are partially touching one another;

rating 4 = slightly dusty if the round paper filter displays small dots of colour but no connected spots of colour;

rating 5 = negligibly dusty if the round paper filter displays a scarcely perceptible staining, with at most scattered small dots of colour.

The preparations obtainable according to the invention are used for dyeing and printing or optically brightening materials which can be dyed or optically brightened with these preparations, particularly textile materials.

In the following Examples which further illustrate the invention, the term 'parts' denotes parts by weight, and the temperature values are given in degrees Centigrade.

EXAMPLE 1

36 parts of dextrin and 10 parts of sodium sulphate are dissolved in 200 parts of water, and to the solution are added, with stirring, 100 parts of a moist press cake containing 47 parts of the dye of the formula

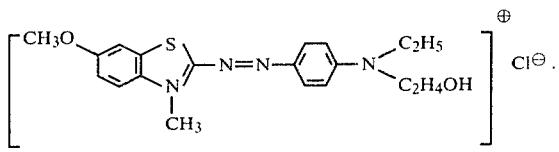

There are then added 2 parts of a condensation product from 1 mole of nonylphenol and 9.5 moles of ethylene oxide. The suspension is adjusted with 10% aqueous sodium hydroxide solution to a pH value of 4 to 4.5; it is thoroughly stirred, and then atomised in a spray dryer containing a cooled atomising organ (according to German Offenlegungsschrift No. 2,459,895). Five parts of a condensation product from 1 mole of nonylphenol with 9.5 moles of ethylene oxide, which has been heated to 80°–100°, are subsequently finely sprayed onto the spray-dried dye in a heatable intensive mixer having a heating-jacket temperature of 60°–80°. Mixing in this manner yields a non-dusty dye preparation having the dust rating 5, which exhibits even after storage for six months at 20° no change in its dust-release behaviour.

A preparation having equally good properties is obtained by using, instead of the condensation product from 1 mole of nonylphenol with 9.5 moles of ethylene oxide, a nonylphenol having another degree of ethoxylation (e.g. 12 moles of ethylene oxide), with otherwise the same processing procedure being followed.

EXAMPLE 2

44 parts of dextrin are dissolved in 140 parts of water, and to the solution are added, with stirring, 100 parts of a moist press cake containing 47 parts of the dye of the formula

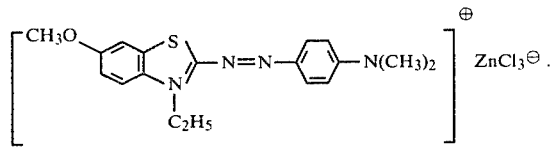

The suspension is adjusted to have a pH value of 4 to 4.5; it is then well stirred and atomised in a spray dryer containing a cooled atomising organ (according to German Offenlegungsschrift No. 2,459,895). The spray-dried dye is subsequently sprayed, in a mixer at 40°–60°, with 9 parts of a dust-binding agent (condensation product from 1 mole of nonylphenol and 9.5 moles of ethylene oxide). This procedure yields a dye preparation having the dust rating 5, which exhibits even after six months' storage at 20° no change in its dust-release behaviour.

If there are used, instead of 44 parts of dextrin, 12 parts of sodium sulphate and 35 parts of dextrin, with the procedure otherwise remaining the same, there is obtained a dye which, after the addition of 6 parts of the above-mentioned dust-binding agent, has its dust bound (dust rating 5).

EXAMPLE 3

34 parts of dextrin, 7 parts of sodium sulphate, 5 parts of water and 86 parts of a moist press cake containing 52 parts of the dye of the formula

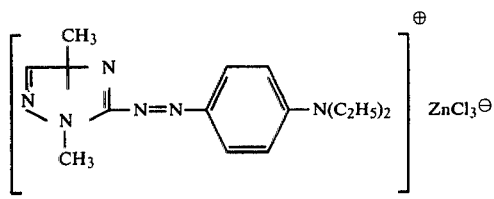

are mixed together. From this viscous paste is prepared, by the addition of 160 parts of water accompanied by stirring, a thinly liquid suspension which, after adjustment of the pH value to 4.5, is atomised in a spray dryer containing a cooled atomising organ (according to German Offenlegungsschrift No. 2,459,895). The dye spray-dried in this manner is subsequently sprayed, in an intensive mixer with 7 parts of a condensation product from 1 mole of nonylphenol and 9.5 moles of ethylene oxide, at about 80°.

There is obtained in this way a negligibly dusty dye preparation having the dust rating 5, which exhibits even after storage for 10 months at 25° no change in its dust-release behaviour.

A dye preparation having equally good dust properties is obtained by using, instead of 34 parts of dextrin, equal parts of sorbitol, polyvinyl alcohol, polyethylene glycol having a molecular weight of 4000, neopentyl glycol or hydrated dextrose, with otherwise the same processing procedure being followed.

EXAMPLE 4

To 70 parts of water are added 10 parts of the condensation product from 1 mole of nonylphenol and 9.5 parts of ethylene oxide, 31 parts of dextrin, and 115 parts of a moist press cake containing 59 parts of the dye of the formula

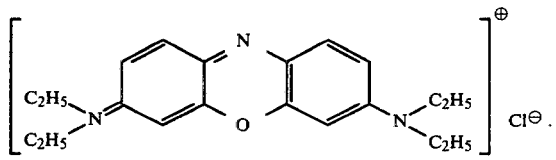

The suspension obtained is subsequently adjusted to have a pH value of 4.5; it is then stirred, and subsequently dried in a spray dryer. In this way is obtained a dye in which the dust is bound (dust rating 5), which dye exhibits even after 6 months in storage the same dust-binding action.

A dye preparation having its dust equally well bound is obtained by using, instead of the above-mentioned condensation product, equal parts of a condensation product from 1 mole of ricinoleic acid with 15 moles of ethylene oxide or polyethylene glycol having a molecular weight of 200 to 4000 or oleic acid diethanolamide, with the processing procedure otherwise being identical. If the procedure as described above is carried out except that before spray drying only 4–5 parts of the respective dust-binding agent are added, with the remaining 5–6 parts being applied to the spray-dried dye, there are likewise obtained products in which the dust is bound.

EXAMPLE 5

90 parts of the dry dye of the formula

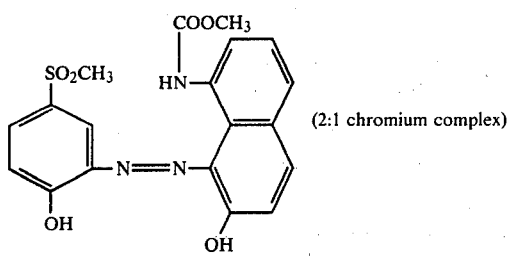

of the commercial composition are stirred with 10 parts of sorbitol and 100 parts of water. This suspension is then spray dried, with the dye obtained having 4.8% of residual moisture. The spray-dried dye is subsequently mixed at room temperature with 5 parts of a condensation product from nonylphenol and 7 moles of ethylene oxide. There is obtained a dye preparation in which the dust is bound and which remains in this condition for at least six months.

A similarly good binding of the dust in the product is obtained by adding to the above-mentioned suspension, before spray drying, 10 parts of polyethylene glycol of molecular weight 4000, and then spray drying.

EXAMPLE 6

15 parts of dextrin are dissolved in 30 parts of water, and mixed with 320 parts of a moist press cake containing 78 parts of the dye of the formula

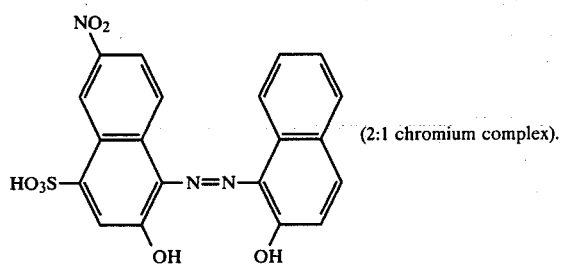

The pH value of the suspension is adjusted to 5.0–5.5. Seven parts of the condensation product of nonylphenol with 9.5 moles of ethylene oxide are then added, and the material is spray dried in a spray dryer. There is obtained a dye preparation having the dust rating 4–5, which shows no change in its dust-release behaviour even after storage at 25° for 6 months.

Preparations in which the dust is equally well bound are obtained by using, instead of 7 parts of the above-mentioned condensation product, equal amounts of stearyl alcohol polyglycol ether or of a mixture of lauryltrihydroxyethylsulphate and dihydroxyethyllaurinamide.

EXAMPLE 7

30 parts of dextrin are dissolved in 100 parts of water and mixed with 140 parts of a moist press cake containing 65 parts of the dye of the formula

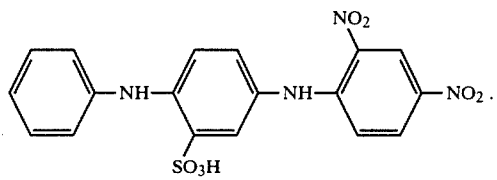

The suspension is adjusted to pH 7.0–7.5, and then dried in a spray dryer. The dye thus obtained is subsequently sprayed in a mixer at 30°–40° with 5 parts of the condensation product from nonylphenol and 9.5 moles of ethylene oxide. There is obtained a dye preparation having the dust rating 4–5.

We claim:

1. A process for the production of negligibly dusty preparations by spray drying an aqueous suspension consisting essentially of water, at least one water-soluble dye or optical brightner, at least one water-soluble adhesive containing at least five hydroxyl groups per molecule wherein said adhesive softens or melts in the temperature range of 30°–150° C., and in the presence or absence of diluting agents, dispersing agents, stabilisers against oxidative or reductive effects, pH-adjusting acids, bases or buffering agents; and wherein a dust-binding water-soluble surface-active agent is added to said aqueous suspension, or said dust-binding water-soluble surface-active agent is added to the spray-dried product, or partially to said aqueous suspension and partially to the spray-dried product.

2. Process according to claim 1, wherein the aqueous suspension contains at least one adhesive and a dust-binding agent.

3. Process according to claim 1, wherein the dust-binding agent is added to the product after this has been spray dried.

4. Process according to claim 1, wherein the dust-binding agent is added partially to the aqueous suspension containing at least one adhesive and partially to the spray-dried product.

5. Process according to claim 1, wherein the adhesive is added in amounts of 10 to 50 percent by weight, relative to the dry final product, to the aqueous suspension.

6. Process according to claim 1, wherein the dust-binding agent is used in an amount of 1 to 15 percent by weight, relative to the dry final product.

7. Process according to claim 1, wherein the dye used is a cationic dye in the form of a moist press cake.

8. Process according to claim 1, wherein the adhesive used is dextrin, sorbitol or polyvinyl alcohol.

9. Process according to claim 1, wherein the dust-binding agent used is a condensation product from an aliphatic alcohol with ethylene oxide.

10. Process according to claim 1, wherein the dust-binding agent used is a condensation product from an alkylphenol with ethylene oxide.

11. Process according to claim 1, wherein the dust-binding agent used is a condensation product from fatty acid with ethylene oxide.

12. Process according to claim 1, wherein polethylene glycols, fatty acid amides or fatty acid ethanolamides are used as dust-binding agents.

13. Process according to claim 1, wherein the dust-binding agent is finely or coarsely sprayed onto the spray-dried product.

14. Process according to claim 13, wherein the dust-binding agent is heated to about 60°–100° C. and is then applied to the spray-dried product heated to about 60°–85° C.

* * * * *